H. F. STRATTON.
CONTROLLER FOR ELECTRIC MOTORS.
APPLICATION FILED JULY 17, 1913.

1,122,657.

Patented Dec. 29, 1914.

2 SHEETS—SHEET 1.

WITNESSES:

INVENTOR
H. F. Stratton
BY
F. N. Barber
ATTORNEY

H. F. STRATTON.
CONTROLLER FOR ELECTRIC MOTORS
APPLICATION FILED JULY 17, 1913.

1,122,657.

Patented Dec. 29, 1914.

2 SHEETS—SHEET 2.

WITNESSES:
Elva Staniek
Alice E. Duff

INVENTOR
H. F. Stratton
BY
F. N. Barber
ATTORNEY

UNITED STATES PATENT OFFICE.

HARRY F. STRATTON, OF CLEVELAND, OHIO, ASSIGNOR TO THE ELECTRIC CONTROLLER AND MANUFACTURING COMPANY, OF CLEVELAND, OHIO, A CORPORATION OF OHIO.

CONTROLLER FOR ELECTRIC MOTORS.

1,122,657.   Specification of Letters Patent.   Patented Dec. 29, 1914.

Application filed July 17, 1913. Serial No. 779,518.

*To all whom it may concern:*

Be it known that I, HARRY F. STRATTON, a citizen of the United States, residing at Cleveland, in the county of Cuyahoga and State of Ohio, have invented new and useful Improvements in Controllers for Electric Motors, of which the following is a specification.

My invention relates to controllers for electric motors, particularly that type in which a part of the motor connections are made at the contacts of an operator's switch and part are made automatically at the contacts of magnetically-operated switches.

Figure 1:
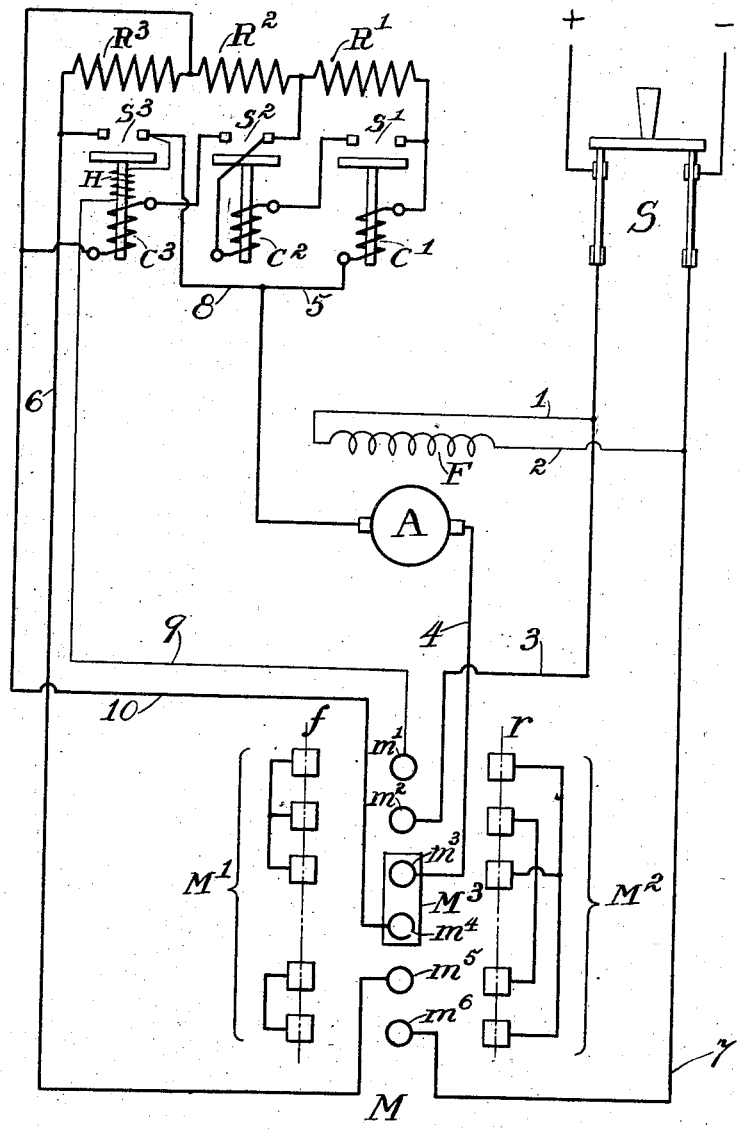
Figure 2:
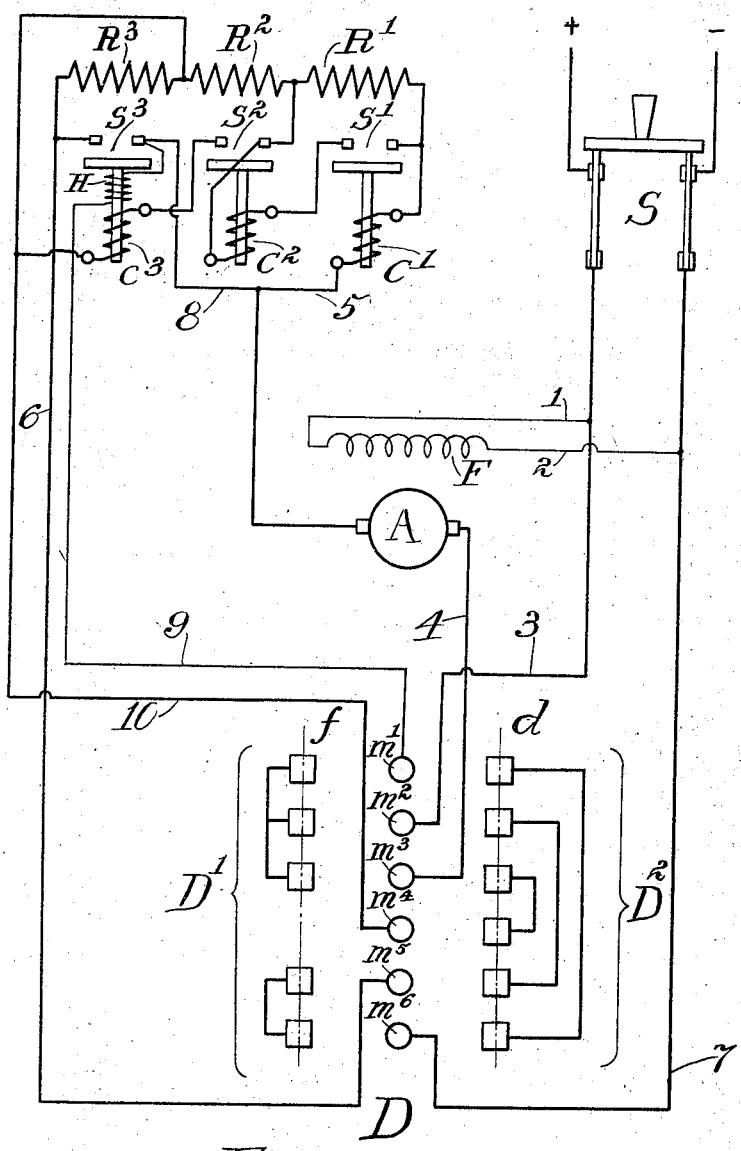

In the accompanying drawings, Figure 1 is a diagrammatic view embodying one form of my invention, and Fig. 2 is a similar view of a modification thereof.

Referring first to Fig. 1, the motor is shown with the armature A and the shunt field F. An operator's switch is shown at M. A service switch is shown at S for connecting the system to a suitable source of supply. The resistance for the motor circuit is shown at $R'$, $R^2$, and $R^3$, and this is arranged to be controlled by the switches $S'$, $S^2$, and $S^3$. I prefer to use for these switches the type of switch disclosed in Eastwood's patent, No. 1,040,292, in which the operating windings of the switches are arranged to be connected in the motor circuit, and which are adapted to remain open when the current in the windings is above a predetermined amount, and will operate to close their contacts when the current is reduced. The operating windings of the switches are indicated at $C'$, $C^2$, and $C^3$. The switch $S^3$ is also provided with a shunt holding winding H, which is adapted to hold the switch closed after it has been closed by its operating winding, but the winding H is not sufficient to close the switch from its open position.

The operator's switch has a series of contact fingers $m'$ to $m^6$, arranged to engage the contacts M' when the operator's switch is moved to the position $f$. In like manner they will engage the contacts $M^2$ when the operator's switch is moved to the position $r$. When the operator's switch is at its central position, as shown in the drawing, the contact fingers $m^3$ and $m^4$ engage the contacts $M^3$ and are connected thereby. When the operator's switch is moved to the position $f$, the connections are so made as to run the motor in one direction, and when it is moved to the position $r$ the connections are made to run the motor in the opposite direction, the current being reversed in the motor armature. At the central position the armature is connected in a closed or dynamic braking circuit through the contacts $m^3$ and $m^4$ of the operator's switch, this circuit including a portion of the starting resistance and the windings of one or more of the resistance-controlling switches. By this arrangement the motor is made to come to a quick stop when the controller is moved to the central position, the current being maintained at a high value in the motor circuit by the automatic cutting out of the starting resistance by the resistance-controlling switches. If it is desired to allow the motor to stop without applying dynamic braking, the controller may be moved from position $f$ or $r$ to a position intermediate these positions and the central position, whereupon the motor circuit is opened at the contacts of the operator's switch, and the motor will come to rest due to the friction of the load it is driving.

I will now describe the operation of the controller. When the switch S is closed, the shunt field F is energized through the wires 1 and 2. Upon movement of the operator's switch to the position $f$, the motor circuit is as follows: From the positive through the wire 3, the contact finger $m^2$, the contacts M', the contact finger $m^3$, the wire 4, the motor armature A, the wire 5, the winding $C'$, the resistances $R'$, $R^2$, and $R^3$, the wire 6, the contact finger $m^5$, the contacts M', the contact finger $m^6$ and the wire 7 to the negative. The motor starts in the forward direction and is brought up to speed by the cutting out of the resistances $R'$, $R^2$, and $R^3$ by means of the resistance switches $S'$, $S^2$, and $S^3$. The switch $S'$ in closing cuts out the resistance $R'$ and energizes the winding $C^2$; the switch $S^2$ in closing cuts out the resistance $R^2$ and energizes the winding $C^3$; the switch $S^3$ in closing cuts out the resistance $R^3$ and deënergizes the windings $C'$, $C^2$, and $C^3$, the current in the motor circuit now flowing from the armature through the wire 8, the contacts of the switch $S^3$, and the wire 6, instead of through the previously traced path through the resistances $R'$, $R^2$, and $R^3$. The switch $S^3$ is now held closed by its holding winding H, whose circuit is from the positive through the wire 3, the contact finger $m^2$, the contacts M', the contact finger $m'$, the wire 9, the winding H, the contacts of the switch $S^3$, the wire 6, and the contact fingers $m^5$ and $m^6$ and the wire 7 to the negative. If it is now desired to stop the motor quickly, the operator's switch is moved to the central position, whereupon the motor is disconnected from the source of supply at the contacts of the operator's switch and a dynamic braking circuit is closed including the contact fingers $m^3$ and $m^4$ of the operator's switch. This circuit is as follows: From the armature A through the wire 4, the contact finger $m^3$, the contact $M^2$, the contact finger $m^4$, the wire 10 to a point between the resistances $R^2$ and $R^3$, thence through the resistances $R^2$ and $R'$, the winding C', and the wire 5 to the other side of the armature. The first rush of current holds open the switch S', but when the current diminishes, this switch closes and cuts out the resistance R' and energizes the winding $C^2$. The switch $S^2$ is closed when the current again diminishes to the proper value, whereupon the resistance $R^2$ is cut out and the current now flows through all of the windings C', $C^2$, and $C^3$. The armature is quickly brought to rest, and when the current ceases, the switches S', $S^2$, and $S^3$ drop open and the motor is ready to be started again.

If the operator's switch is moved to the position $r$, current flows through the wire 3, the contact finger $m^2$, the contacts $M^2$, the contact finger $m^5$, the wire 6, the resistances $R^3$, $R^2$, and R', the winding C', the wire 5, the armature A, the wire 4, the contact finger $m^3$, contacts $M^2$, the contact finger $m^6$, and the wire 7 to the negative. The current is reversed through the armature circuit, thus causing the motor to run in the opposite direction. The switches S', $S^2$, $S^3$ will proceed to cut out the starting resistance, as before described, to bring the motor up to speed. The current through the holding winding H has also been reversed, so that the magnetism produced by this winding will correspond to the magnetism produced by the winding $C^3$. The circuit through the winding H is now as follows: From the positive through the wire 3, the contact finger $m^2$, the contacts $M^2$, the finger $m^5$, the wire 6, the contacts of the switch $S^3$, the winding H, the wire 9, the contact finger M', the contacts $M^2$, the contact finger $m^6$, and the wire 7 to the negative. Upon movement of the operator's switch to the central position the dynamic braking circuit will be closed as before described, but the current will flow in a circuit beginning at the left-hand brush of the armature A, and will go by way of the wire 5, the winding C', the resistances R' and $R^2$, the wire 10, the contact fingers $m^4$ and $m^3$, and the wire 4 to the right-hand brush of the armature. The slowing down of the motor is accomplished by movement of the operator's switch to the central position from either of the running positions, and the same set of resistance switches control the current in the motor circuit whether the motor is started in the forward or reverse direction, or whether it is stopped by dynamic braking.

Referring to Fig. 2, in which the operator's switch D is arranged to run the motor in one direction only, the contact fingers $m'$ to $m^6$ have the same arrangement as in Fig. 1, and the contacts D' are the same as the contacts M'. The contacts $D^2$, however, are changed to make the proper connections for bringing the motor to rest when the controller is moved to the position $d$ after the motor has been running as the result of the operator's switch having been moved to the position $f$. When the operator's switch D is moved to the position $f$ the motor is started in the same manner as described under Fig. 1. When it is desired to stop the motor the operator may move the operator's switch to the central position and cut the motor off from the line, allowing it to stop by its friction load, but if he wishes to stop the motor quickly, the operator's switch is moved to the position $d$, whereupon the motor circuit will be as follows: From the right-hand brush of the armature A, the wire 4, the contact finger $m^3$, the contact $D^2$, the contact finger $m^4$, the wire 10, the resistances $R^2$ and R', the winding C' of the switch S', and the wire 5 to the left-hand brush of the armature. The dynamic braking circuit thus established causes the retardation of the armature, and the current in this circuit is maintained at a high value by the cutting out of the resistances R' and $R^2$ at the closure of the switches S' and $S^2$. When the switch $S^2$ closes, the winding $C^3$ is energized, causing the switch $S^3$ to close.

In order that the holding winding H may produce a magnetism in the switch frame corresponding to that produced by the winding $C^3$, its circuit is reversed through the contacts of the operator's switch and current flows in it as follows: From the positive through the wire 3, the contact finger $m^2$, the contacts $D^2$, the contact finger $m^5$, the wire 6, the contacts of the switch $S^3$, the winding H, the wire 9, the contact finger $m'$, the contacts $D^2$, the contact finger $m^6$, and the wire 7 to the negative. The switch $S^3$ will remain closed as long as the operator holds the operator's switch in the position $d$, and the dynamic braking circuit will be maintained at its lowest resistance through the contacts of the switch $S^3$ until the motor has absolutely come to rest.

It will be obvious to those skilled in the art that numerous changes can be made in the apparatus without departing from the spirit of my invention.

I claim—

1. In a motor control system, a source of supply, a motor, a circuit therefor, a switch, a winding for closing the switch to control the motor circuit, and an operator's switch containing means for connecting the motor to the source in series with the said winding for accelerating the motor and for connecting the motor and the said winding in a dynamic braking circuit to retard the motor.

2. In a motor control system, a motor armature, a resistance for controlling the current therein, a switch for the resistance, an operating winding therefor energized by current through the armature, and an operator's switch for connecting the motor armature to a source of supply in series with the resistance and the said switch winding and for connecting the motor armature, the resistance, and the switch winding in a dynamic braking circuit.

3. In a motor control system, a motor armature, a circuit therefor, resistance in the circuit, a series of switches for controlling the resistance, operating windings for the switches energized by current through the motor armature, a shunt holding winding for at least the last switch of the series, and an operator's switch for reversing the current in the motor armature, the said operating windings, and the said shunt holding winding.

4. In a motor control system, a source of supply, a motor armature, a resistance, a series of magnetically-operated switches for cutting out said resistance, operating windings therefor energized by current through the motor armature, a shunt holding winding for the last switch of the series, connections whereby the last switch in closing deënergizes its operating winding, and an operator's switch for connecting the motor armature to the source in series with the resistance and the said operating windings, for disconnecting the source and for reversing the current in the armature, resistance, operating windings, and shunt holding winding.

5. In a motor control system, a source of supply, a motor armature, a resistance, a series of magnetically-operated switches for cutting out the said resistance, operating windings therefor energized by current through the motor armature, a shunt holding winding for the last switch of the series, connections whereby the last switch in closing deënergizes its operating winding, and an operator's switch for connecting the motor armature to the source in series with the resistance and the said operating windings, for disconnecting the source, for connecting the armature, resistance, and operating windings in a dynamic braking circuit, and for reversing the current in the said shunt holding winding.

Signed at Cleveland, Ohio, this 15th day of July, A. D. 1913.

HARRY F. STRATTON.

Witnesses:
J. H. HALL,
W. M. DIEMER.